US012623343B2

(12) United States Patent

Chu et al.

(10) Patent No.: US 12,623,343 B2

(45) Date of Patent: May 12, 2026

(54) ROBOT AND METHOD FOR CONTROLLING THEREOF

(71) Applicant: Samsung Electronics Co., Ltd.,
Suwon-si (KR)

(72) Inventors: Jiho Chu, Suwon-si (KR);
Jongmyeong Ko, Suwon-si (KR);
Sangkyung Lee, Suwon-si (KR);
Koeun Choi, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 214 days.

(21) Appl. No.: 18/190,281

(22) Filed: Mar. 27, 2023

(65) Prior Publication Data

US 2023/0226689 A1     Jul. 20, 2023

Related U.S. Application Data

(63) Continuation of application No. PCT/KR2022/012612, filed on Aug. 24, 2022.

(30) Foreign Application Priority Data

Aug. 25, 2021   (KR) ........................ 10-2021-0112665

(51) Int. Cl.
*B25J 9/16*          (2006.01)
*B25J 5/00*          (2006.01)
(Continued)

(52) U.S. Cl.
CPC ............... *B25J 9/1661* (2013.01); *B25J 5/00*
(2013.01); *B25J 9/161* (2013.01); *B25J 9/163*
(2013.01);
(Continued)

(58) Field of Classification Search
CPC ... B25J 9/1661; B25J 5/00; B25J 9/161; B25J
9/163; B25J 9/1653; B25J 9/1697; B25J
13/003; B25J 19/023
See application file for complete search history.

(56) References Cited

U.S. PATENT DOCUMENTS

| | | |
|---|---|---|
| 8,548,627 B2 | 10/2013 | Ulmer et al. |
| 10,423,150 B2 | 9/2019 | Wise et al. |

(Continued)

FOREIGN PATENT DOCUMENTS

| | | |
|---|---|---|
| CN | 108764739 A | 11/2018 |
| CN | 110091337 A | 8/2019 |

(Continued)

OTHER PUBLICATIONS

European Office Action dated Sep. 18, 2024, issued in European Application No. 22861697.5.

(Continued)

*Primary Examiner* — Jay Khandpur

(74) *Attorney, Agent, or Firm* — Jefferson IP Law, LLP

(57) ABSTRACT

A robot is provided. The robot includes a microphone, a camera, a communication interface including a circuit, a memory storing at least one instruction, and a processor, wherein the processor is configured to acquire a user voice through the microphone, identify a task corresponding to the user voice, determine whether the robot can perform the identified task, and control the communication interface to transmit information on the identified task to an external robot based on the determination result.

15 Claims, 11 Drawing Sheets

(51) Int. Cl.
   B25J 13/00        (2006.01)
   B25J 19/02        (2006.01)

(52) U.S. Cl.
   CPC ........... B25J 9/1653 (2013.01); B25J 9/1697
                   (2013.01); B25J 13/003 (2013.01); B25J
                                              19/023 (2013.01)

(56)                References Cited

U.S. PATENT DOCUMENTS

| | | |
|---|---|---|
| 10,596,695 B1 | 3/2020 | Bareddy |
| 10,960,544 B2 | 3/2021 | Kaminka et al. |
| 11,389,949 B2 | 7/2022 | Torii et al. |
| 11,440,185 B2 | 9/2022 | Ito et al. |
| 11,449,074 B2 | 9/2022 | Lee et al. |
| 11,465,290 B2 | 10/2022 | Park et al. |
| 11,945,651 B2 | 4/2024 | Sohn |
| 2006/0020368 A1* | 1/2006 | Tanaka .................... B25J 9/161 |
| | | 700/259 |
| 2011/0071674 A1* | 3/2011 | Jeon ....................... B25J 13/003 |
| | | 901/1 |
| 2018/0200884 A1* | 7/2018 | Perets ................... G06N 3/008 |
| 2020/0055183 A1 | 2/2020 | Ito et al. |
| 2020/0101974 A1* | 4/2020 | Ha ........................ H04W 4/024 |
| 2020/0207358 A1* | 7/2020 | Katz ................. G02B 27/0093 |
| 2020/0282549 A1 | 9/2020 | Torii et al. |
| 2021/0053233 A1 | 2/2021 | Hatayama et al. |
| 2021/0092912 A1 | 4/2021 | Wykman et al. |
| 2021/0097103 A1 | 4/2021 | Kang et al. |
| 2021/0174370 A1 | 6/2021 | Yim et al. |
| 2021/0373576 A1 | 12/2021 | Sohn |
| 2021/0387346 A1* | 12/2021 | Gillett ................. B25J 19/0075 |
| 2022/0234207 A1* | 7/2022 | Pekarek-Kostka .... B25J 13/089 |
| 2022/0324646 A1 | 10/2022 | Sohn |
| 2023/0062175 A1* | 3/2023 | Yahata ................... G08B 25/04 |
| 2024/0042617 A1* | 2/2024 | Sakurai ................. B25J 9/1697 |

FOREIGN PATENT DOCUMENTS

| | | | |
|---|---|---|---|
| CN | 115709468 A | * | 2/2023 |
| JP | 4254588 B2 | | 4/2009 |
| JP | 5040186 B2 | | 10/2012 |
| JP | 2020-021351 A | | 2/2020 |
| JP | 6811688 B2 | | 1/2021 |
| KR | 10-1162373 B1 | | 7/2012 |
| KR | 10-2018-0083342 A | | 7/2018 |
| KR | 10-2019-0023835 A | | 3/2019 |
| KR | 10-2019-0094313 A | | 8/2019 |
| KR | 10-2019-0141892 A | | 12/2019 |
| KR | 10-2137033 B1 | | 7/2020 |
| KR | 10-2021-0072588 A | | 6/2021 |
| KR | 10-2021-0099217 A | | 8/2021 |
| KR | 10-2021-0099670 A | | 8/2021 |
| WO | 2017/072771 A1 | | 5/2017 |
| WO | 2019/058694 A1 | | 3/2019 |
| WO | 2020-141636 A1 | | 7/2020 |

OTHER PUBLICATIONS

European Office Action dated Oct. 9, 2025, issued in European Patent Application No. 22861697.5.
Korean Office Action dated Mar. 24, 2026, issued in Korean Application No. 10-2021-0112665.

* cited by examiner

| CHARACTERISTIC INFORMATION | WEIGHT |
|---|---|
| AGE | w_age=0.3687 |
| HEIGHT | w_height=0.1046 |
| WEIGHT | w_weight=0.3120 |
| SEX | w_sex=0.2147 |

32

| CATEGORY | PLACE |  |  |  |
|---|---|---|---|---|
| CLOTHING | A STORE |  |  |  |
|  | B STORE |  |  |  |
|  | ...... | ... | ... | ... |
| GENERAL MERCHANDISE |  |  |  |  |
| RESTAURANT | ... |  |  |  |
| ... |  |  |  |  |

| AGE | PREFERENCE SCORE |
|---|---|
| 10S | 0.1201 |
| 20S | 0.2433 |
| 30S | 0.5612 |
| 40S | 0.0754 |

| SEX | PREFERENCE SCORE |
|---|---|
| MALE | 0.7421 |
| FEMALE | 0.2579 |

| HEIGHT | PREFERENCE SCORE |
|---|---|
| <160cm | 0.0523 |
| <170cm | 0.3765 |
| <180cm | 0.3921 |
| <=180cm | 0.1791 |

| WEIGHT | PREFERENCE SCORE |
|---|---|
| <40kg | 0.1201 |
| <50kg | 0.2433 |
| <60kg | 0.2612 |
| <70kg | 0.1721 |
| <80kg | 0.0624 |
| <90kg | 0.1312 |
| >=90kg | 0.0097 |

```
CHARACTERISTIC INFORMATION OF USER:
  height: 173cm
  weight: 74kg
  age: 46
  sex: male
INFORMATION FOR A TASK:
  Category: Dining
    Category: Japanese Restaurant
      Category: Noodle
  Group:
    size: 4
  Extra:
    taste: spicy
    has_kids: true
```

ROBOT AND METHOD FOR CONTROLLING THEREOF

CROSS-REFERENCE TO RELATED APPLICATION(S)

This application is a continuation application, claiming priority under § 365(c), of an International application No. PCT/KR2022/012612, filed on Aug. 24, 2022, which is based on and claims the benefit of a Korean patent application number 10-2021-0112665, filed on Aug. 25, 2021, in the Korean Intellectual Property Office, the disclosure of which is incorporated by reference herein in its entirety.

BACKGROUND

1. Field

The disclosure relates to a robot and a method for controlling thereof. More particularly, the disclosure relates to a robot which transmits information to an external robot for providing a service corresponding to a user command, and a method for controlling thereof.

2. Description of Related Art

Spurred by the development of robot technologies, robots providing services are being actively used nowadays. For example, service robots are providing various services such as serving food in a restaurant, or guiding the way to a user at a mart, etc.

The above information is presented as background information only to assist with an understanding of the disclosure. No determination has been made, and no assertion is made, as to whether any of the above might be applicable as prior art with regard to the disclosure.

SUMMARY

Meanwhile, in an environment wherein several robots exist, tasks that each robot can perform may vary from one another. Here, if a specific robot cannot perform a task corresponding to a user command, the user may feel inconvenience.

Aspects of the disclosure are to address at least the above-mentioned problems and/or disadvantages and to provide at least the advantages described below. Accordingly, an aspect of the disclosure is to provide a technology for providing a continuous service to a user even in case a robot cannot perform a task corresponding to a user command.

Another aspect of the disclosure is to provide a robot that makes a user provide with a service even in case a task corresponding to a user command cannot be performed.

Additional aspects will be set forth in part in the description which follows and, in part, will be apparent from the description, or may be learned by practice of the presented embodiments.

Meanwhile, the technical tasks of the disclosure are not limited to the technical tasks mentioned above, and other technical tasks that were not mentioned would be clearly understood by those having ordinary skill in the technical field to which the disclosure belongs from the descriptions below.

In accordance with an aspect of the disclosure for resolving the aforementioned technical task, a robot is provided. The robot includes a microphone, a camera, a communication interface including a circuit, a memory storing at least one instruction, and a processor, wherein the processor is configured to acquire a user voice through the microphone, identify a task corresponding to the user voice, determine whether the robot can perform the identified task, and control the communication interface to transmit information on the identified task to an external robot based on the determination result may be provided.

The processor may, based on determining that the robot cannot perform the identified task, identify location information for a target place based on the user voice and characteristic information of the user, control the robot to move to the target place based on the location information, and control the communication interface to transmit the information on the identified task and the characteristic information of the user to an external robot located around the target place.

The characteristic information of the user may include at least one of the height, the weight, the age, the sex, or the hairstyle of the user, and the processor may acquire an image by photographing the user through the camera, and input the image into a neural network model trained to acquire characteristic information for objects and acquire the characteristic information of the user.

The memory may store location information for a plurality of places included in a map wherein the robot is located, and the processor may analyze the user voice and identify at least one place among the plurality of places, calculate scores for the at least one place based on the characteristic information of the user, and identify one place having the highest score among the at least one place as the target place, and acquire location information for the target place in the memory.

The memory may store a weight corresponding to the characteristic information of the user for calculating the scores for the at least one place, and the processor may receive information related to an operation of the user in the target place from the external robot, and update the weight based on the information related to the operation of the user.

The processor may identify the external robot, which is the closest to the target place, among a plurality of external robots that can be communicatively connected to the robot, and perform communicative connection with the identified external robot.

The processor may, in order for the external robot to identify the user, control the communication interface to transmit the image, acquired by photographing the user through the camera, to the external robot.

The robot may further include a light emitting part, wherein the processor may, in order for the external robot to identify the user, control the light emitting part to irradiate a guide light around the user.

The memory may store information for tasks that the robot can perform, and the processor may compare a task corresponding to the user voice and the stored information, and determine whether the robot can perform the task corresponding to the user voice.

In accordance with another aspect of the disclosure for resolving the aforementioned technical task, a method for controlling a robot is provided. The method includes the operations of acquiring a user voice, identifying a task corresponding to the user voice, determining whether the robot can perform the identified task, and transmitting information on the identified task to an external robot based on the determination result may be provided.

The controlling method may further include the operations of, based on determining that the robot cannot perform the identified task, identifying location information for a target place based on the user voice and characteristic information of the user, moving the robot to the target place based on the location information, and transmitting the information on the identified task and the characteristic information of the user to an external robot located around the target place.

The controlling method may further include the operations of acquiring an image by photographing the user, and inputting the image into a neural network model trained to acquire characteristic information for objects and acquiring the characteristic information of the user.

The robot may store location information for a plurality of places included in a map wherein the robot is located, and the operations of identifying the location information for the target place may include the operations of analyzing the user voice and identifying at least one place among the plurality of places, calculating scores for the at least one place based on the characteristic information of the user, identifying one place having the highest score among the at least one place as the target place, and acquiring location information for the target place among the location information for the plurality of places.

The robot may store a weight corresponding to the characteristic information of the user for calculating the scores for the at least one place, and the controlling method may further include the operations of receiving information related to an operation of the user in the target place from the external robot, and updating the weight based on the information related to the operation of the user.

The controlling method may further include the operations of identifying the external robot, which is the closest to the target place, among a plurality of external robots that can be communicatively connected to the robot, and performing communicative connection with the identified external robot.

The controlling method may further include the operation of, in order for the external robot to identify the user, transmitting the image, acquired by photographing the user through the camera, to the external robot.

The controlling method may further include the operation of, in order for the external robot to identify the user, irradiating a guide light around the user.

The robot may store information for tasks that the robot can perform, and in the operation of determining whether the robot can perform the identified task, a task corresponding to the user voice and the stored information may be compared, and it may be determined whether the robot can perform the task corresponding to the user voice.

Meanwhile, the means for resolving the task of the disclosure are not limited to the aforementioned means for resolution, and means for resolution that were not mentioned would be clearly understood by a person having ordinary skill in the technical field to which the disclosure pertains from this specification and the accompanying drawings.

According to the various embodiments of the disclosure as above, a robot can make a user provided with a service even in case a task corresponding to a user command cannot be performed. Accordingly, user convenience and satisfaction can be improved.

Other than the above, regarding effects that can be acquired or predicted from the embodiments of the disclosure, direct or implicit descriptions will be made in the detailed description for the embodiments of the disclosure. For example, regarding various effects that are predicted according to the embodiments of the disclosure, descriptions will be made in the detailed description that will be described below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram for illustrating a method of identifying a target place according to an embodiment of the disclosure;

FIG. 4 is a diagram for illustrating information that a robot transmits to an external robot according to an embodiment of the disclosure;

Throughout the drawings, it should be noted that like reference numbers are used to depict the same or similar elements, features, and structures.

DETAILED DESCRIPTION

Figure 1:
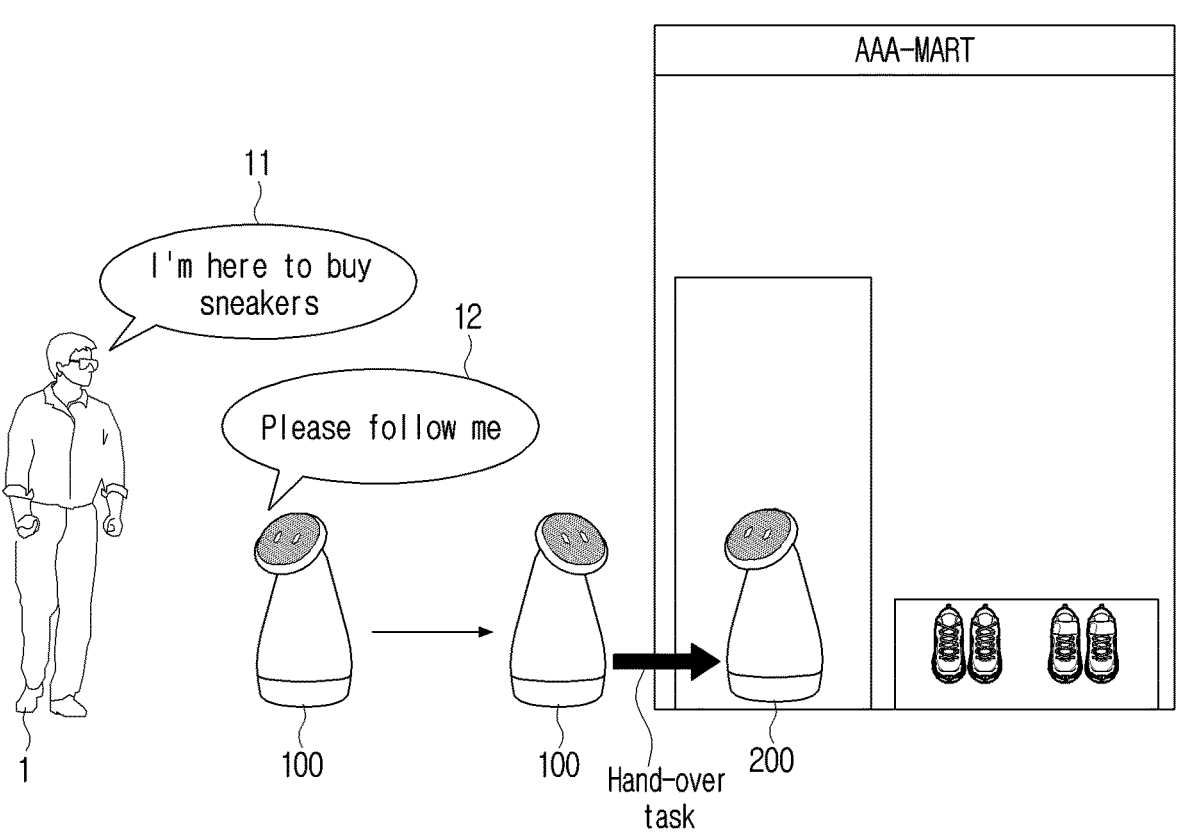
FIG. 1 is a diagram for illustrating a concept of a robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives included in the idea and the technical scope disclosed herein. Meanwhile, in describing the embodiments, in case it is determined that detailed explanation of related known technologies may unnecessarily confuse the gist of the disclosure, the detailed explanation will be omitted.

Further, terms such as "first," "second" and the like may be used to describe various elements, but the elements are not intended to be limited by the terms. Such terms are used only to distinguish one element from another element.

Further, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a concept of a robot according to an embodiment of the disclosure. For example, a robot 100 and an external robot 200 may be retail bots. However, it should be noted that this is merely an embodiment, and the disclosure is not limited thereto.

Referring to FIG. 1, a robot 100 may acquire a user voice 11. The robot 100 may analyze the user voice 11 and identify a task corresponding to the user voice 11. For example, a task corresponding to the user voice 11 may be 'guiding products.'

Meanwhile, the robot 100 may determine whether the task corresponding to the user voice 11 can be performed. In case the robot 100 can perform the task corresponding to the user voice 11, the robot 100 may perform the task corresponding to the user voice 11. For example, the robot 100 may output a response 12 regarding the user voice 11, and guide a user 1 to a sneakers store.

However, the robot 100 may not be able to perform the task corresponding to the user voice 11. For example, the task corresponding to the user voice 11 may not be included in tasks that can be performed by the robot 100. Alternatively, there may be a case wherein it would be more effective if another external robot 200 different from the robot 100 performs the task corresponding to the user voice 11.

Here, the robot 100 may guide the user to the place wherein the external robot 200 is located, and hand over the task corresponding to the user voice 11 to the external robot 200. Accordingly, the user 1 may be provided with a continuous service from the robot 100 and the external robot 200.

Hereinafter, the configuration of the robot 100 will be examined.

Figure 2:
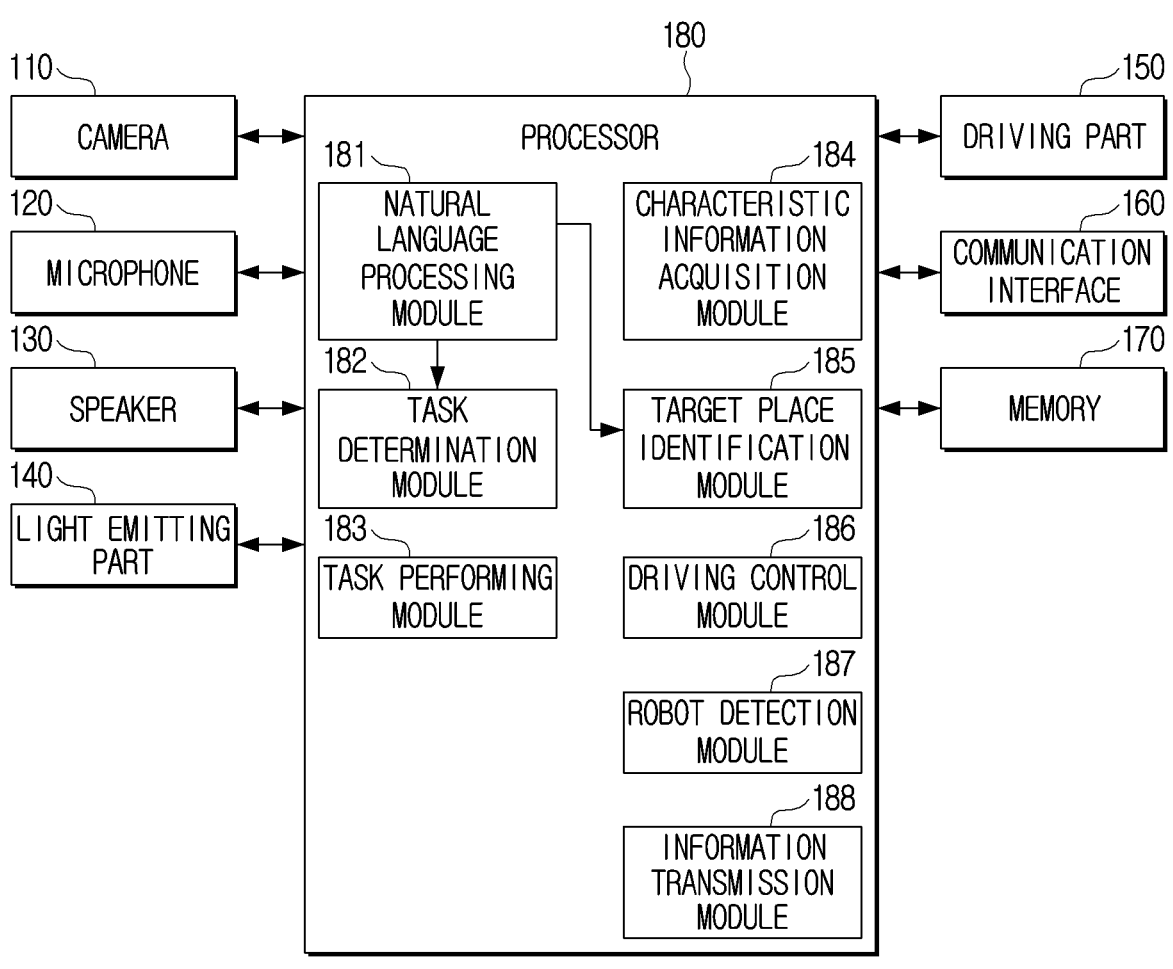
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, a robot 100 may include a camera 110, a microphone 120, a speaker 130, a light emitting part 140, a driving part 150, a communication interface 160, a memory 170, and a processor 180.

The camera 110 is a component for acquiring an image that photographed the surroundings of the robot 100. In particular, the processor 180 may acquire an image that photographed a user through the camera 110. The camera 110 may include various image sensors. For example, the camera 110 may include at least one of a complementary metal oxide semiconductor (CMOS) image sensor or a charge coupled device (CCD) image sensor.

The microphone 120 may acquire a user voice. The processor 180 may identify a task corresponding to the user voice based on the user voice acquired through the microphone 120.

The speaker 130 is a component outputting a sound. For example, the speaker 130 may output a guide voice for guiding a user or a response regarding a user voice.

The light emitting part 140 is a component for providing a visual effect or a guide light to a user or an external robot, and it may include at least one light output element. For example, the light emitting part 140 may include a light emitting diode (LED) and a laser diode (LD).

The driving part 150 may include a wheel moving the robot 100 and a wheel driving motor rotating the wheel. Also, the driving part 150 may further include a motor driving circuit supplying a driving current to the wheel driving motor, a power transmission module transmitting a rotating force of the wheel driving motor to the wheel, and a rotation detection sensor detecting a rotation displacement and a rotation speed of the wheel driving motor or the wheel.

The communication interface 160 may include at least one circuit, and perform communication with various types of external devices. The communication interface 160 may perform communication with an external robot. For example, the communication interface 160 may transmit information on a task corresponding to a user voice and characteristic information of a user to an external robot.

Meanwhile, the communication interface 160 may perform Peer to Peer (P2P) communication with an external robot. For example, the communication interface 160 may perform communication with an external robot by Bluetooth Low Energy (BLE). That is, the robot 100 may identify an external robot 200 by broadcasting an advertising packet. Alternatively, the robot 100 may perform communication with an external robot through wireless fidelity (Wi-Fi) direct. However, this is merely an embodiment, and the communication interface 160 may perform communication with an external robot by using a long distance communication network such as a legacy cellular network, a 5G network, a next generation communication network, the Internet, or a computer network (e.g.: a local area network (LAN) or a wide area network (WAN)).

Also, the communication interface 160 may include at least one of a Bluetooth Low Energy (BLE) module, a Wi-Fi communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module.

The memory 170 may store an operating system (OS) for controlling the overall operations of the components of the robot 100, and instructions or data related to the components of the robot 100. For example, the memory 170 may store map information of the space wherein the robot 100 is located. Also, the memory 170 may store a Point of Interest (POI) database including location information for a place included in the space wherein the robot 100 is located. In addition, the memory 170 may store information on tasks that the robot 100 can perform. For example, the tasks that the robot 100 can perform may include 'guiding the way,' 'guiding products,' and 'payment.'

Also, the memory 170 may store data necessary for a module for controlling the operations of the robot 100 to perform various kinds of operations. The module for controlling the operations of the robot 100 may include a natural language processing module 181, a task determination module 182, a task performing module 183, a characteristic information acquisition module 184, a target place identification module 185, a driving control module 186, a robot detection module 187, and an information transmission module 188. Also, the memory 170 may store a neural network model trained to acquire characteristic information for objects. Meanwhile, the memory 170 may be implemented as a non-volatile memory (ex: a hard disc, a solid state drive (SSD), a flash memory), a volatile memory, etc.

The processor 180 may be electronically connected with the memory 170, and control the overall functions and operations of the robot 100. If a user voice is input, the processor 180 may load data for modules 181 to 188 to perform various kinds of operations stored in a non-volatile memory on a volatile memory. Here, loading means an operation of calling in data stored in a non-volatile memory to a volatile memory and storing the data, so that the processor 180 can access the data.

The natural language processing module 181 may perform natural language processing (NLP) and identify a task corresponding to a user voice, and acquire a response for the user voice. The natural language processing module 181 may include a speech recognition module, a natural language understanding module, a dialog management module, a natural language generation module, and a speech synthesis module. As an example, the speech recognition module may acquire a text corresponding to the user voice and transmit the text to the natural language understanding module. The natural language understanding module may acquire a feature vector corresponding to the transmitted text.

The task determination module 182 may identify a task corresponding to a user voice. As an example, the task determination module 182 may identify a task corresponding to a user voice based on a text corresponding to the user voice. The task determination module 182 may identify a keyword included in the text corresponding to the user voice, and identify a task corresponding to the identified keyword. For this, in the memory 170, keywords and tasks may be matched with one another and stored.

As another example, the task determination module 182 may identify a task corresponding to a user voice based on a feature vector corresponding to a text. In the memory 170, a plurality of vectors corresponding to a plurality of respective predefined tasks may be stored in advance. The task determination module 182 may calculate similarity between the feature vector corresponding to the text and the plurality of respective vectors stored in advance. The task determination module 182 may identify a task corresponding to a vector having the highest calculated similarity among the plurality of tasks.

As still another example, the task determination module 182 may identify a task corresponding to a user voice by using a neural network model trained to identify a task corresponding to a user voice. The task determination module 182 may input a user voice into the neural network model, and identify a task corresponding to the user voice.

Meanwhile, the task determination module 182 may determine whether the robot 100 can perform the identified task. For example, a task database including information on tasks that the robot 100 can perform may be stored in the memory 170. The task determination module 182 may search the task database and determine whether the identified task is included in the task database. That is, the task determination module 182 may compare the identified task and the information included in the task database, and determine whether the identified task is included in the task database.

If the identified task is included in the task database, the task determination module 182 may determine that the robot 100 can perform the identified task. In contrast, if the identified task is not included in the task database, the task determination module 182 may determine that the robot 100 cannot perform the identified task.

In case it was determined that the robot 100 can perform the identified task, the task performing module 183 may perform the identified task. For example, the task performing module 183 may control the speaker 130 to output a response acquired through the natural language processing module 181. Alternatively, the task performing module 183 may control the driving part 150 to drive to a place corresponding to the identified task.

The characteristic information acquisition module 184 may analyze an image that photographed a user acquired through the camera 110, and acquire characteristic information of the user. Here, the characteristic information may include at least one of the height, the weight, the age, the sex, or the hairstyle. For example, the characteristic information acquisition module 184 may input the image, photographed of the user, into the neural network model, and acquire the characteristic information of the user. Here, the neural network model may have been trained to acquire characteristic information for objects.

The target place identification module 185 may identify a target place based on information on a user voice and characteristic information of a user. Meanwhile, a plurality of places included in a map wherein the robot 100 is located may be classified according to categories, and stored in the POI database. Here, the target place identification module 185 may identify one category among a plurality of categories based on information on a user voice (e.g., a text corresponding to a user voice, a feature vector). For example, the target place identification module 185 may identify 'a clothing category' based on a user voice ("I'm here to buy clothes").

The target place identification module 185 may calculate scores for each of the plurality of places corresponding to one category identified based on the characteristic information of the user. Here, the target place identification module 185 may calculate scores for each of the plurality of places based on the characteristic information of the user, and weights and preference scores corresponding to each element included in the characteristic information. Here, the weights and the preference scores may have been stored in the POI database in advance. For example, the target place identification module 185 may calculate scores by summing up values of multiplying the weights and the preference scores for each item of the characteristic information.

The target place identification module 185 may identify a place having the highest score among the plurality of places as the target place. For example, in case the score for 'an A store' is 0.7, and the score for 'a B store' is 0.5, the target place identification module 185 may identify 'the A store' as the target place. Meanwhile, the target place identification module 185 may store priority information for the plurality of places based on the calculated scores in the memory 170. As a score is higher, the priority of a place may be higher.

The target place identification module 185 may acquire location information for the identified target place. For example, in the memory 170, location information for each of the plurality of places included in the map wherein the robot 100 is located may have been stored. The target place identification module 185 may acquire the location information for the identified target place in the memory 170.

The driving control module 186 may control the driving part 150 to move to the target place based on the acquired location information. Accordingly, the robot 100 may move to the target place. Meanwhile, while the robot 100 is moving to the target place, the processor 180 may control the speaker 130 to output a guide voice (e.g., "Please follow me").

The robot detection module 187 may detect an external robot that is located around the target place, and can perform the identified task. As an example, the robot detection module 187 may photograph the surroundings of the target place through the camera 110 and acquire an image, and analyze the image and identify an external robot of which distance from the robot 100 is the closest among a plurality of external robots included in the image. As another example, in the memory 170, location information of each of the plurality of external robots that can be communicatively connected with the robot 100 may have been stored. Here, the robot detection module 187 may identify an external robot, which is the closest to the target place, among the plurality of external robots as an external robot to perform the task, based on the stored location information.

The information transmission module 188 may perform communicative connection with the identified external robot. Then, the information transmission module 188 may transmit at least one of the information for the task identified through the task determination module 182 or the characteristic information of the user acquired through the characteristic information acquisition module 184 to the external robot that was communicatively connected. Also, the information transmission module 188 may transmit the priority information for the plurality of places stored in the memory 170 to the external robot. Accordingly, the external robot may perform the identified task, and provide a service to the user.

Meanwhile, in order that an external robot can perform a task, there is a need to identify a user. In order that an external robot can identify a user, the processor 180 may control the robot 100. As an example, the processor 180 may store an image photographed of a user in the memory 170, and control the communication interface 160 to transmit the stored image to an external robot. As another example, the processor 180 may control the light emitting part 140 to irradiate a light that can be identified by an external robot to the surroundings of a user (e.g., a bottom surface right in front of a user).

Meanwhile, the processor 180 may receive feedback information related to an operation of a user in a target place from an external robot through the communication interface 160. Here, the feedback information may include the time that the user stayed in the target place, the time spent for the external robot to perform a task corresponding to a user voice, whether the user purchased a product in the target place, an evaluation of satisfaction about a service, and whether the user repeatedly requested the same task.

The processor 180 may accumulate and store the feedback information in the memory 170, and update the POI database based on the stored feedback information. In particular, the processor 180 may update a weight corresponding to the characteristic information based on the feedback information. For example, in case a male user in his 20s purchased a product in 'the A store,' but a female user in her 20s did not purchase a product in 'the A store,' the processor 180 may increase a weight for the sex item among the items of the characteristic information corresponding to 'the A store.' Alternatively, in case a user in his/her 20s purchased a product in 'the B store,' but users in their 30s to 60s did not purchase a product in 'the B store,' the processor 180 may increase a weight for the age item among the items of the characteristic information corresponding to 'the B store.' Accordingly, the target place identification module 185 may identify a target place corresponding to a user intent.

Meanwhile, in FIG. 2, each module 181 to 188 of the robot 100 were described as the components of the processor 180, but this is merely an embodiment, and the modules 181 to 188 may be stored in the memory 170. Here, the processor 180 may load the modules 181 to 188 stored in the memory 170 from the non-volatile memory to the volatile memory, and execute each function of the plurality of modules 181 to 188. Also, each module of the processor 180 may be implemented as software, or as a form wherein software and hardware are combined.

FIG. 3 is a diagram for illustrating a method of identifying a target place according to an embodiment of the disclosure.

Also, FIG. 3 is a table indicating information stored in the POI database according to an embodiment of the disclosure. In the POI database, information for places of each category, weights 31 of the characteristic information corresponding to each place, and preference scores 32 corresponding to each place may have been stored. Here, the places of each category means the places included in the space wherein the robot 100 is located. As illustrated in the drawings, the preference scores 32 include scores corresponding to each item (the age, the height, the weight, the sex) included in the characteristic information.

As described above, the robot 100 may identify a specific category based on a user voice. For example, the robot 100 may analyze a user voice ("I'm here to buy clothes") and identify a 'clothing' category. Like this, if a specific category is identified, the robot 100 may calculate scores for each of a plurality of places corresponding to the identified category. For example, the robot 100 may calculate a score for 'the A store' corresponding to the 'clothing category.' Here, the robot 100 may acquire the preference score 32 corresponding to 'the A store' in the POI database.

The robot 100 may calculate scores for each store based on the weights 31, the preference scores 32, and characteristic information of users corresponding to each store. For example, in case the age of a user is 20s, the height is 173 cm, the weight is 75 kg, and the sex is male, the robot 100 may identify preference scores corresponding to the characteristic information of the user among the preference scores 32. That is, the robot 100 may acquire preference scores (0.2433, 0.3765, 0.0624, 0.7421) as preference scores regarding (the age, the height, the weight, the sex). Then, the robot 100 may sum up the values of multiplying the weights and the preference scores corresponding to each item of the characteristic information, and calculate a score for 'the A store.' For example, the robot 100 may calculate a score for 'the A store' based on Equation 1.

$$\text{score of store } A = (w\_age*0.2433) + \\ (w\_height*0.3765) + (w\_weight*0.0624) + \\ (w\_sex*0.7421) \qquad \text{Equation 1}$$

Likewise, the robot 100 may calculate scores for each store corresponding to the clothing category.

FIG. 4 is a diagram for illustrating information that a robot transmits to an external robot according to an embodiment of the disclosure.

As described above, the robot 100 may guide a user to a target place, and then transmit information regarding the characteristic information of the user, and a task corresponding to a user voice to an external robot. The transmitted information 41 may include the characteristic information including the height, the weight, the age, and the sex of the user. Also, the transmitted information 41 may include the information for the task corresponding to the user voice. The information for the task may include various kinds of information related to the user voice. For example, in case the task corresponding to the user voice is related to ordering food, the information on the task may include the type of the food, the menu, the number of the members of the user group including the user, etc.

Meanwhile, in order for an external robot to provide a service to a user, there is a need to identify a user. Accordingly, the robot 100 may perform an operation for an external robot to identify a user.

Figure 5A:
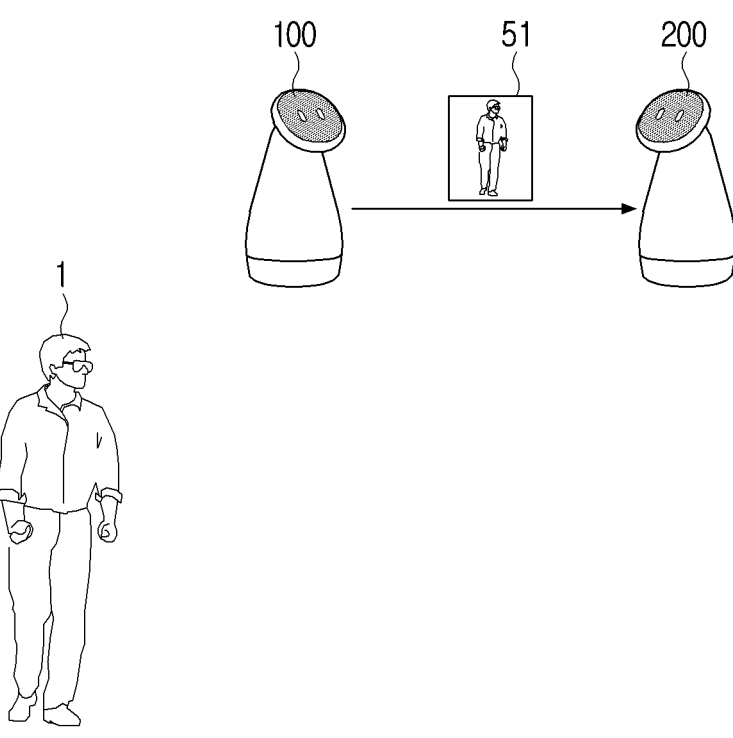
FIG. 5A is a diagram for illustrating a method of identifying a user according to an embodiment of the disclosure.

FIG. 5A is a diagram for illustrating a method of identifying a user according to an embodiment of the disclosure.

The robot 100 may transmit an image 51 that photographed a user 1 to an external robot 200. As the external robot 200 can photograph the surroundings through the camera, the image that photographed the surroundings and the received image 51 may be compared, and the user 1 may thereby be identified.

Figure 5B:
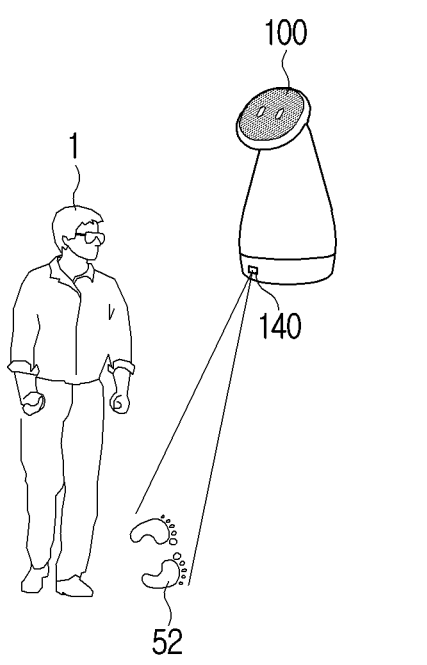
FIG. 5B is a diagram for illustrating a method of identifying a user according to an embodiment of the disclosure.
Figure 5B:
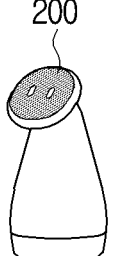

FIG. 5B is a diagram for illustrating a method of identifying a user according to an embodiment of the disclosure.

The robot 100 may irradiate a light that can be identified by the external robot 200 around the user 1. For example, the robot 100 may irradiate a pattern light 52 on the bottom around the user 1 through the light emitting part 140. The external robot 200 may detect the pattern light 52, and identify the user 1.

Figure 5C:
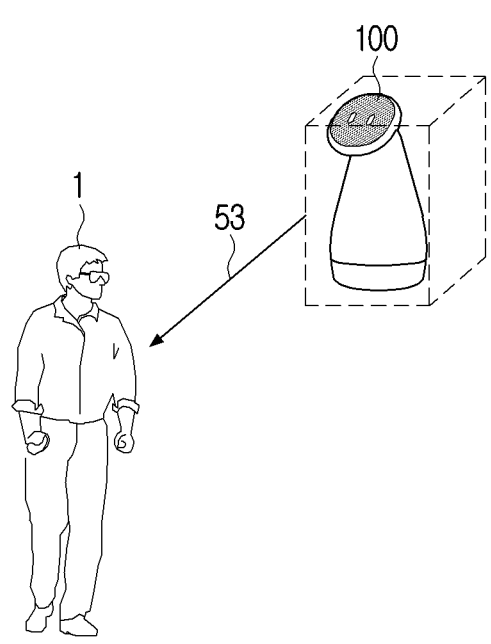
FIG. 5C is a diagram for illustrating a method of identifying a user according to an embodiment of the disclosure.
Figure 5C:
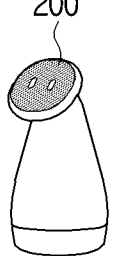

FIG. 5C is a diagram for illustrating a method of identifying a user according to an embodiment of the disclosure.

The robot 100 may perform communicative connection with the external robot 200, and then rotate or move to view the user 1 face to face. Afterwards, the robot 100 may transmit a signal to the external robot 200. When the signal is received, the external robot 200 may identify the direction 53 in which the robot 100 views the user 1, and identify the user 1 based on the direction 53.

Figure 5D:
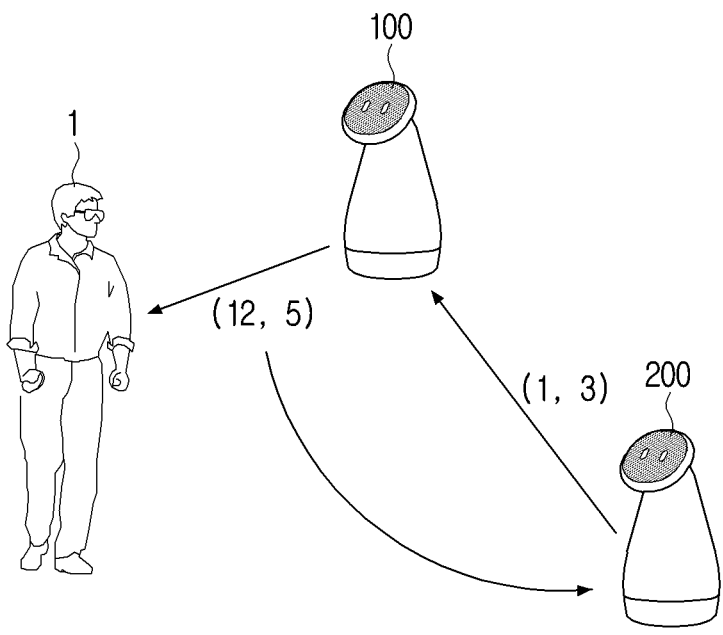
FIG. 5D is a diagram for illustrating a method of identifying a user according to an embodiment of the disclosure.

FIG. 5D is a diagram for illustrating a method of identifying a user according to an embodiment of the disclosure.

The robot 100 may acquire location information for the user 1. Here, the location information for the user 1 may include the distance from the robot 100 to the user 1, and the direction of viewing the user 1 based on the robot 100. For example, the robot 100 may acquire a first vector (12, 5) as the location information for the user 1. Then, the robot 100 may transmit the location information for the user 1 to the external robot 200.

Meanwhile, the external robot 200 may acquire location information for the robot 100. For example, the external robot 200 may acquire a second vector (1, 3) as the location information for the robot 100. The external robot 200 may identify the user 1 based on the location information for the user 1 received from the robot 100, and the location information for the robot 100. For example, the external robot 200 may acquire the location information of the user 1 based on the first vector (12, 5) and the second vector (1, 3), and identify the user 1.

Figure 5E:
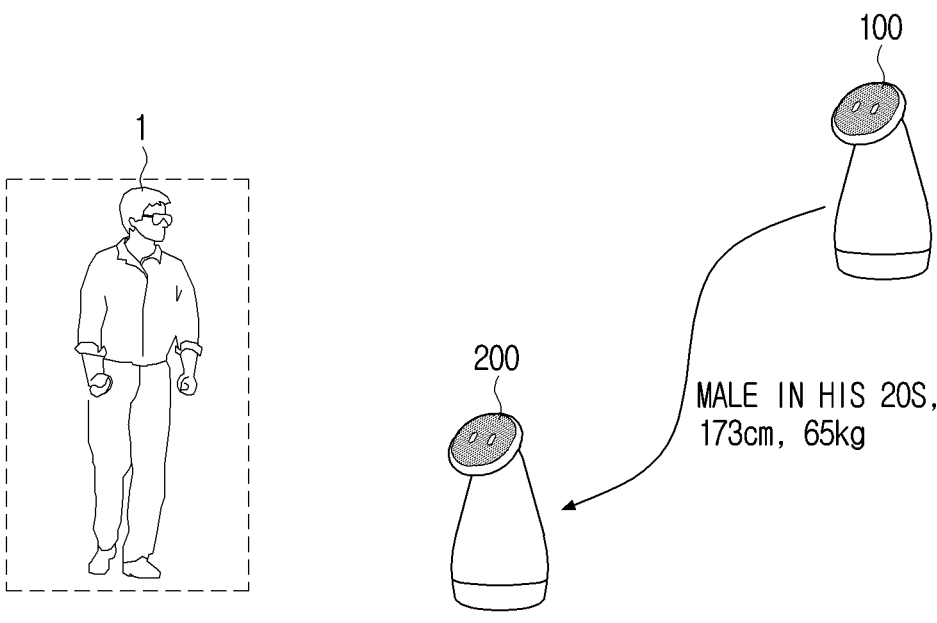
FIG. 5E is a diagram for illustrating a method of identifying a user according to an embodiment of the disclosure.

FIG. 5E is a diagram for illustrating a method of identifying a user according to an embodiment of the disclosure.

The robot 100 may transmit characteristic information of a user to the external robot 200. For example, the robot 100 may transmit first characteristic information of a user (a male in his 20s, 173 cm, 65 kg) to the external robot 200. Meanwhile, like the robot 100, the external robot 200 may acquire an image that is photographed of the user 1 and analyze the image, and acquire the characteristic information for the user. For example, the external robot 200 may acquire second characteristic information of the user. Here, the external robot 200 may determine similarity between the first characteristic information and the second characteristic information. Then, if the similarity is higher than a predetermined value, the external robot 200 may identify the user 1 as a subject for a service.

Meanwhile, so far, an example wherein the robot 100 provides one service to a user was suggested as an example, but depending on cases, a user voice may include a plurality of requests. Here, the robot 100 may identify a plurality of tasks corresponding to the user voice, and operate to perform the identified tasks. For this, the robot 100 may cooperate with a plurality of external robots, and provide services to a user.

Figure 6:
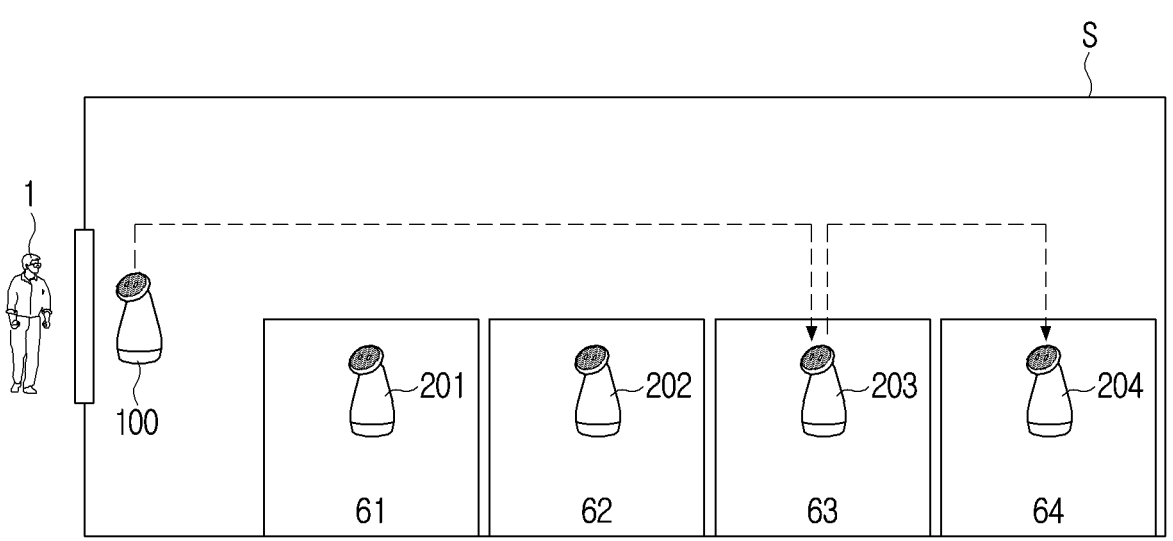
FIG. 6 is a diagram for illustrating an operation of a robot according to an embodiment of the disclosure.

FIG. 6 is a diagram for illustrating an operation of a robot according to an embodiment of the disclosure.

The space S wherein the robot 100 is located is a large shopping mall, and it may include a plurality of stores. For example, the space S may include a first store to a fourth store 61, 62, 63, 64. Also, in the space S, a plurality of external robots may exist. For example, in each of the first store to the fourth store 61, 62, 63, 64, a first external robot to a fourth external robot 201, 202, 203, 204 may be located.

The robot 100 may identify the user 1 entering the space S, and acquire a user voice (e.g., "I want to buy a laptop pouch, and eat pork cutlet") from the user 1. Then, the robot 100 may identify a first task (e.g., 'guiding products') and the second task (e.g., 'guiding food') corresponding to the user voice. Also, the robot 100 may acquire characteristic information of the user (e.g., a male in his 30s).

The robot 100 may identify the third store 63 as the target place in the POI database based on the first task and the characteristic information of the user. For example, the third store 63 may be an accessory store. The robot 100 may guide the user 1 while moving to the third store 63. Then, the robot 100 may perform communicative connection with the third external robot 203 located in the third store 63, and transmit the characteristic information of the user and the information on the first task to the third external robot 203.

The third external robot 203 may provide a product guiding service by guiding the user to the 'pouch' corner located inside the third store 63 based on the information for the first task. Meanwhile, the robot 100 may receive feedback information for the service result from the third external robot 203. For example, the third external robot 203 may transmit information regarding whether the user 1 purchased a product or the evaluation of satisfaction about the service to the robot 100. Alternatively, while the third external robot 203 is providing the service to the user 1, the robot 100 may identify the user 1, and acquire the time that the user 1 stays in the third store 63 as feedback information. The robot 100 may update the POI database based on the feedback information. In particular, the robot 100 may update the weight stored in the POI database.

Meanwhile, while the user 1 is staying in the third store 63, the robot 100 may wait near the third store 63. Then, when the user 1 gets out of the third store 63, the robot 100 may determine that the first task was completed, and perform an operation related to the second task. The robot 100 may identify the fourth store 64 as the target place in the POI database based on the second task and the characteristic information of the user. For example, the fourth store 64 may be a Japanese restaurant. The robot 100 may guide the user 1 while moving to the fourth store 64. Then, the robot 100 may perform communicative connection with the fourth external robot 204 located in the fourth store 64, and transmit the characteristic information of the user and the information on the second task to the fourth external robot 204.

The fourth external robot 204 may guide a pork cutlet menu based on the information on the second task. Then, the fourth external robot 204 may acquire feedback information of the user 1 (e.g., the user's evaluation about the pork cutlet). The fourth external robot 204 may transmit the feedback information to the robot 100. Accordingly, the robot 100 may update the POI database based on the feedback information.

Like this, the robot 100 may provide a continuous service to a user through a cooperation with a plurality of external robots. Accordingly, the user's convenience and satisfaction can be improved.

Figure 7:
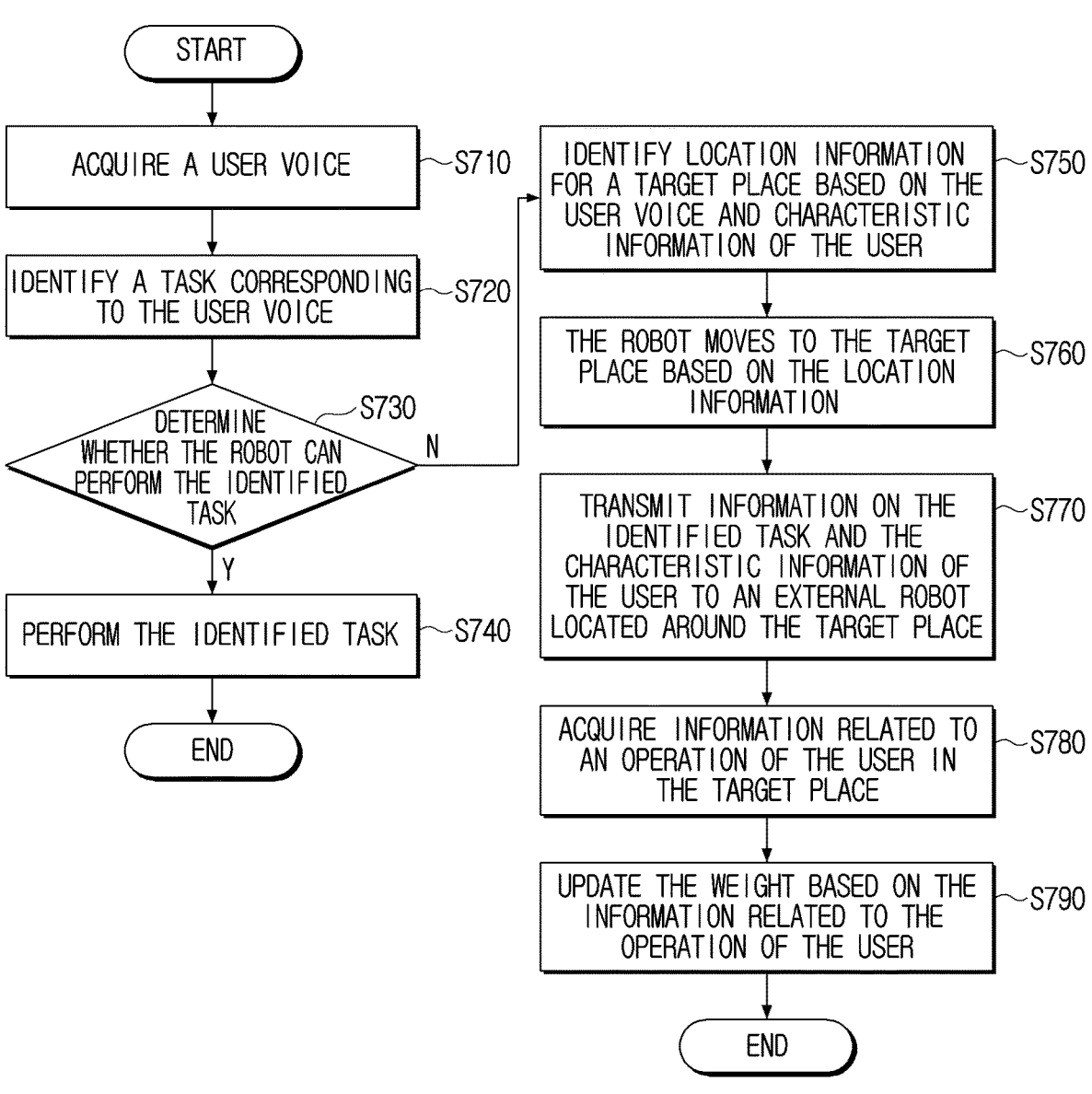
FIG. 7 is a flowchart for illustrating a method of controlling a robot according to an embodiment of the disclosure.

FIG. 7 is a flowchart for illustrating a method of controlling a robot according to an embodiment of the disclosure.

The robot 100 may acquire a user voice in operation 5710, identify a task corresponding to the user voice in operation 5720, and determine whether the identified task can be performed in operation 5730. In case it was determined that the identified task can be performed, the robot 100 may perform the identified task in operation 5740.

In contrast, in case it was determined that the identified task cannot be performed, the robot 100 may identify location information for a target place based on the user voice and characteristic information of the user in operation 5750. Meanwhile, the robot 100 may acquire an image from a photograph of the user, and input the acquired image into a neural network model trained to acquire characteristic information for objects and acquire characteristic information of the user.

The robot 100 may store location information for a plurality of places included in a map (or a space) wherein the robot is located. The robot 100 may analyze the user voice and identify at least one place among the plurality of stored places. Then, the robot 100 may calculate scores for the at least one place based on the characteristic information of the user. The robot 100 may identify one place having the highest score among the at least one place as the target place. Then, the robot 100 may acquire location information for the target place among the location information for the plurality of places. As the method of calculating scores for places was described in detail in FIG. 3, overlapping explanation will be omitted.

The robot 100 may move to the target place based on the location information in operation 5760, and transmit information on the identified task and the characteristic information of the user to an external robot located around the target place in operation 5770. Accordingly, the user may be provided with a service from the external robot.

Meanwhile, the robot 100 may acquire information related to an operation of the user in the target place in operation 5780, and update the weight based on the information related to the operation of the user in operation 5790. For example, the robot 100 may receive feedback information of the user for the service provided in the target place from the external robot. Then, the robot 100 may update the weight stored in the POI database based on the feedback information of the user.

Meanwhile, the various embodiments described above may be implemented in a recording medium that can be read by a computer or an apparatus similar to a computer, by using software, hardware, or a combination thereof. In some cases, the embodiments described in this specification may be implemented as the processor itself. According to implementation by software, the embodiments such as procedures and functions described in this specification may be implemented as separate software modules. Each of the software modules may perform one or more functions and operations described in this specification.

Meanwhile, computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a compact disc (CD), a digital video disc (DVD), a hard disk, a Blue-Ray disc, a universal serial bus (USB), a memory card, a read only memory (ROM) and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
   a microphone;
   a camera;
   a communication interface including a circuit;
   memory, storing at least one instruction; and
   a processor,
   wherein the at least one instruction, when executed by the processor, cause the robot to:
     acquire a user voice through the microphone,
     identify a task corresponding to the user voice,
     determine whether the robot is capable of performing the identified task, and
     control the communication interface to transmit information on the identified task from the robot to an external robot based on the determination result,
     based on determining that the robot is not capable of performing the identified task, identify location information for a target place based on the user voice and characteristic information of the user, identify an external robot, from among a plurality of external robots that is to be communicatively connected to the robot, the identified external robot being closest to the target place, perform communicative connection with the identified external robot, control the robot to move to the target place based on the location information; and control the communication interface to transmit the information on the identified task and the characteristic information of the user to an external robot located around the target place.

2. The robot of claim 1, wherein the characteristic information of the user comprises at least one of height, weight, age, sex, or hairstyle of the user, and wherein the at least one instruction, when executed by the processor, further cause the robot to:

acquire an image photographed of the user through the camera, and input the image into a neural network model trained to acquire characteristic information for objects and acquire the characteristic information of the user.

3. The robot of claim 1, wherein the memory stores location information for a plurality of places included in a map wherein the robot is located, and wherein the at least one instruction, when executed by the processor, further cause the robot to:

analyze the user voice and identify at least one place among the plurality of places, calculate scores for the at least one place based on the characteristic information of the user, identify one place having a highest score among the at least one place as the target place, and acquire location information for the target place in the memory.

4. The robot of claim 3, wherein the memory stores a weight corresponding to the characteristic information of the user for calculating the scores for the at least one place, and wherein the at least one instruction, when executed by the processor, further cause the robot to:

receive information related to an operation of the user in the target place from the external robot, and update the weight based on the information related to the operation of the user.

5. The robot of claim 1, wherein the at least one instruction, when executed by the processor, further cause the robot to:

in order for the external robot to identify the user, control the communication interface to transmit an image, acquired by photographing the user through the camera, to the external robot.

6. The robot of claim 1, further comprising:

a light emitting part, wherein the at least one instruction, when executed by the processor, further cause the robot to:

in order for the external robot to identify the user, control the light emitting part to irradiate a guide light around the user.

7. The robot of claim 1, wherein the memory stores information for tasks that the robot is capable of performing, and wherein the at least one instruction, when executed by the processor, further cause the robot to:

compare a task corresponding to the user voice and the stored information, and determine whether the robot is capable of performing the task corresponding to the user voice.

8. A method for controlling a robot, the method comprising:

acquiring a user voice;

identifying a task corresponding to the user voice;

determining whether the robot is capable of performing the identified task;

transmitting information on the identified task from the robot to an external robot based on the determination result;

based on determining that the robot is not capable of performing the identified task, identifying location information for a target place based on the user voice and characteristic information of the user;

identifying an external robot, from among a plurality of external robots that is to be communicatively connected to the robot, the identified external robot being closest to the target place;

performing communicative connection with the identified external robot;

based on determining that the robot is not capable of performing the identified task, identifying location information for a target place based on the user voice and characteristic information of the user;

moving the robot to the target place based on the location information; and transmitting the information on the identified task and the characteristic information of the user to an external robot located around the target place.

9. The method of claim 8, further comprising:

acquiring an image by photographing the user; and inputting the image into a neural network model trained to acquire characteristic information for objects and acquiring the characteristic information of the user.

10. The method of claim 8, wherein the robot stores location information for a plurality of places included in a map wherein the robot is located, and wherein the identifying the location information for the target place comprises:

analyzing the user voice and identifying at least one place among the plurality of places, calculating scores for the at least one place based on the characteristic information of the user, identifying one place having a highest score among the at least one place as the target place, and acquiring location information for the target place among the location information for the plurality of places.

11. The method of claim 10, wherein the robot stores a weight corresponding to the characteristic information of the user for calculating the scores for the at least one place, and wherein the method further comprises:

receiving information related to an operation of the user in the target place from the external robot, and updating the weight based on the information related to the operation of the user.

12. The method of claim 8, further comprising:

identifying the external robot, from among a plurality of external robots that is to be communicatively connected to the robot, the identified external robot being closest to a target place; and performing communicative connection with the identified external robot.

13. The method of claim 10, further comprising identifying a category based on the user voice.

14. The method of claim 13, wherein the calculating of the scores for the at least one place comprises calculating scores for each of a plurality of places corresponding to the identified category.

15. The method of claim 11, wherein the received information related to the operation of the user comprises at least one of time that the user stayed in the target place, time spent for the external robot to perform a task corresponding to a user voice, whether the user purchased a product in the target place, an evaluation of satisfaction about a service, or whether the user repeatedly requested a same task.

\* \* \* \* \*